United States Patent
Frankowski et al.

(10) Patent No.: US 6,375,588 B1
(45) Date of Patent: Apr. 23, 2002

(54) TENSIONER WITH VISCOUS COUPLED ONE WAY WRAP SPRING ANTI-KICKBACK CLUTCH

(75) Inventors: Marek Frankowski; Jacek Stepniak, both of Stroud; Jorma J. Lehtovaara, Etobicoke, all of (CA)

(73) Assignee: Litens Automotive Partnership, Ontario (CA)

( * ) Notice: Subject to any disclaimer, the term of this patent is extended or adjusted under 35 U.S.C. 154(b) by 0 days.

(21) Appl. No.: 09/547,108

(22) Filed: Apr. 11, 2000

Related U.S. Application Data
(60) Provisional application No. 60/128,735, filed on Apr. 12, 1999.

(51) Int. Cl.⁷ ............................................. F16H 7/10
(52) U.S. Cl. ...................... 474/112; 474/101; 474/135
(58) Field of Search ............................. 474/135, 101, 474/136, 138, 139, 117, 115, 107, 112; 192/12 R; 267/69, 195; 152/21; 464/40, 57

(56) References Cited
U.S. PATENT DOCUMENTS

| | | | |
|---|---|---|---|
| 4,270,906 A | 6/1981 | Kraft et al. | 474/135 |
| 4,285,676 A | 8/1981 | Kraft | 474/135 |
| 4,392,840 A * | 7/1983 | Radocaj | 474/117 |
| 4,464,146 A | 8/1984 | Arthur | 474/133 |
| 4,473,362 A | 9/1984 | Thomey et al. | 474/135 |
| 4,551,120 A | 11/1985 | Thomey | 474/135 |
| 4,571,222 A | 2/1986 | Brandenstein et al. | 474/112 |
| 4,583,962 A | 4/1986 | Bytzek et al. | 474/133 |
| 4,634,407 A | 1/1987 | Holtz | 474/112 |
| 4,696,663 A | 9/1987 | Thomey et al. | 474/133 |
| 4,702,727 A | 10/1987 | Dahm | 474/101 |
| 4,721,495 A | 1/1988 | Kan et al. | 474/135 |
| 4,723,934 A | 2/1988 | Thomey | 474/135 |
| 4,725,260 A | 2/1988 | Komorowski et al. | 474/135 |
| 4,808,148 A | 2/1989 | Holtz | 474/112 |
| 4,813,915 A | 3/1989 | Kotzab | 474/133 |
| 4,822,322 A | 4/1989 | Martin | 474/135 |
| 4,824,421 A | 4/1989 | Komorowski | 474/135 |
| 4,826,471 A | 5/1989 | Ushio | 474/135 |
| 4,832,665 A | 5/1989 | Kadota et al. | 474/112 |
| 4,834,694 A | 5/1989 | Martin | 474/135 |
| 4,878,885 A | 11/1989 | Brandenstein et al. | 474/135 |
| 4,917,655 A | 4/1990 | Martin | 474/112 |
| 4,993,993 A | 2/1991 | Gill | 474/111 |
| 5,039,372 A | 8/1991 | Deal | 156/397 |
| 5,073,148 A | 12/1991 | Dec | 474/94 |
| 5,156,573 A | 10/1992 | Bytzek et al. | 474/74 |
| 5,195,932 A | 3/1993 | Hirai et al. | 474/135 |
| 5,234,385 A | 8/1993 | Kawashima et al. | 474/135 |
| RE34,543 E | 2/1994 | Komorowski | 474/135 |
| RE34,616 E | 5/1994 | Komorowski et al. | 474/135 |
| 5,524,725 A | 6/1996 | Schantzen | 180/190 |
| 5,795,257 A | 8/1998 | Giese et al. | 474/109 |

* cited by examiner

*Primary Examiner*—David A. Bucci
*Assistant Examiner*—Timothy McAnulty
(74) *Attorney, Agent, or Firm*—Pillsbury Winthrop LLP

(57) ABSTRACT

A timing belt tensioner for a motor vehicle engine comprising a pivot that is fixed relative to the motor vehicle engine. A tensioner arm is mounted for pivotal movement on the pivot. The tensioner arm has a friction surface disposed in friction sliding relation with an adjacent surface during the pivotal movement. A belt engaging pulley is mounted for rotation on the tensioner arm. A spring coupled with the tensioner arm biases the arm in a direction tending to force the pulley into tensioning engagement with the belt when the tensioner is installed on the motor vehicle engine. The spring biasing the arm into a working position maintains a predetermined range of tension in the belt during dynamic operating equilibrium of the belt. An anti-kickback stop mechanism is coupled with the arm and stops instantaneous kickback movement of the arm against the belt tensioning direction beyond when the arm is instantaneously moved away from the working position against the belt-tensioning direction in response to instantaneous tightening of the belt. The anti-kickback mechanism adjusts a location of the stop position based upon the working position of the arm.

9 Claims, 7 Drawing Sheets

TENSIONER WITH VISCOUS COUPLED ONE WAY WRAP SPRING ANTI-KICKBACK CLUTCH

This application claims the benefit of U.S. Provisional Application No. 60/128,735, filed Apr. 12, 1999.

FIELD OF THE INVENTION

The present invention relates to a timing belt tensioner for a motor vehicle engine.

BACKGROUND OF THE INVENTION

It is known in the belt tensioner art to provide a frictionally damped timing belt tensioner. One such tensioner is disclosed in U.S. Pat. No. 4,824,421 and reissue U.S. Pat. No. RE. 34,543, which are hereby incorporated by reference in full. These patents disclose and teach a tensioner in which the belt load force applied by the belt to the tensioner is translated into force of engagement between friction surfaces which cooperate to dampen pivotal movement of the tensioner arm. The frictional force between these surfaces, which is a function of (among other things) the amount of belt load force applied by the belt, is the primary (essentially total) means of damping tensioner arm movement. The methodology taught in these patents, including the vibratory release that permits tensioner movement when necessary under the influence of engine vibration, has proven to be an extremely effective means of providing the desired tensioning function of a timing belt.

It is also known in the belt tensioner art to provide a belt tensioner with a fixed anti-kickback stop structure, which is used to prevent kickback or sudden movement of the tensioner in a direction against the belt-tensioning direction in response to sudden tightening of the belt (e.g. during rough periods of engine operation). The use of such fixed anti-kickback stop requires careful adjustment of the tensioner during installation, by advancing the tensioner toward the belt by rotating an eccentric internal mounting structure or other known method, so that the tensioner arm will assume a predetermined relative position with respect to the anti-kickback stop when the tensioner is installed. This is important so that the tensioner does not engage the stop prematurely during engine operation, which may cause over tightening of the belt, and also does not permit excessive kickback movement of the tensioner away from the belt, which may permit the belt to skip a tooth on an associated pulley about which the belt is trained. Such precise installation adjustment of the tensioner is tedious and time consuming. It typically requires a pointer associated with the arm to be aligned with some other indicia associated with the tensioner or engine. Even after this initial alignment is made, it may require re-adjusting after the engine is initially rotated after installation to remove any tolerance or "stiction" that may exist in the belt system.

Commonly assigned U.S. Pat. No. 4,583,962 discloses a timing belt tensioning device that includes a one-way clutch mechanism that permits pivotal movement in one direction and limits the pivotal movement in an opposite direction beyond a predetermined distance so as to prevent loosening of the timing belt to an extent that would allow tooth skip. The '962 patent teaches a damping system that dampens the operating movements of the arm permitted by the one-way clutch mechanism. This construction eliminates the need for a fixed anti-kickback stop for various applications. However, the operation of the tensioner disclosed in the '962 patent is such that the one-way clutch operated to prevent the tensioner arm from being substantially moved in a direction against the belt tensioning direction once the tensioner had moved toward the belt to take up belt slack. For certain applications, it may be desirable to enable the arm to back slowly away from the belt-tensioning direction to alleviate high tension in the belt.

SUMMARY OF THE INVENTION

It is an object of the present invention to provide a belt tensioner that avoids the installation difficulties presented by a fixed anti-kickback stop. It is a further object of the invention to provide a belt tensioner that will self adjust the arm stop position based upon the working position of the tensioner arm. It is also an object of the present invention to provide such a tensioner that has a one-way clutch mechanism that will prevent kickback of the tensioner greater than a threshold amount, and will permit the tensioner to be moved slowly against the belt tensioning direction when the belt is tightened (e.g., due to engine expansion under the heat of operation) to prevent over-tightening of the belt.

Other objects and advantages of the invention will become apparent from the following detailed description and appended drawings.

DETAILED DESCRIPTION OF THE INVENTION

Figure 1:
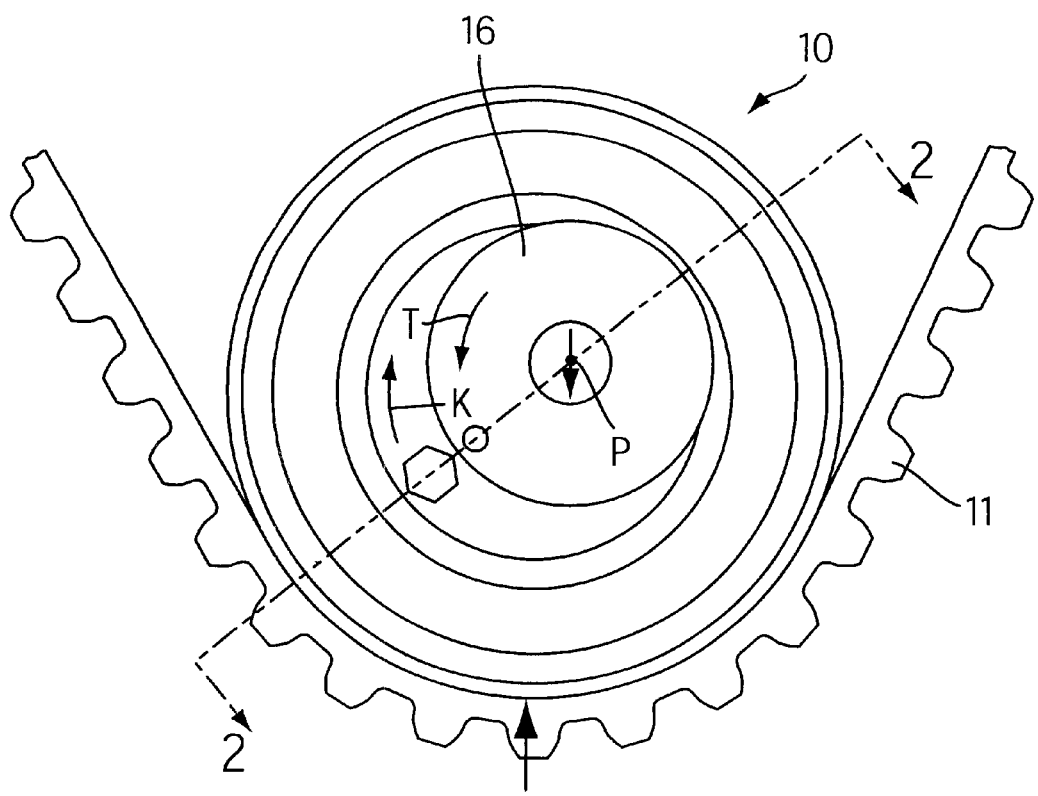
FIG. 1 is a front plan view of a belt tensioner in accordance with the present invention.
Figure 2:
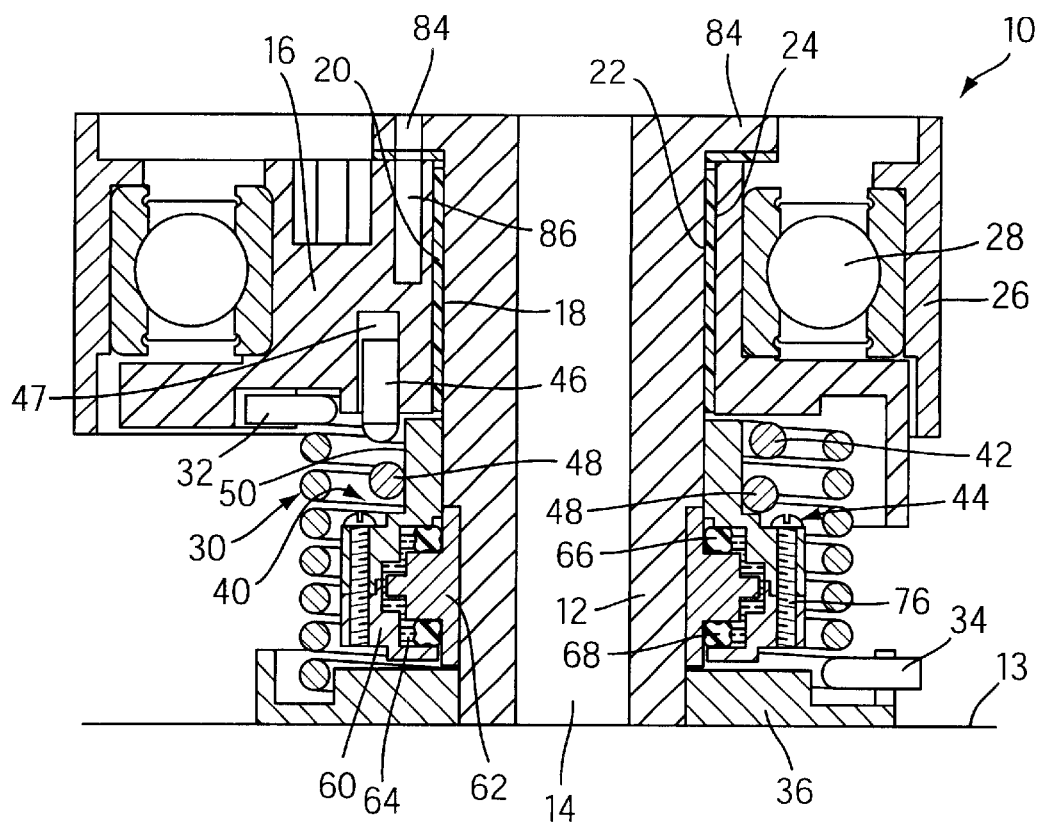
FIG. 2 is a cross-sectional view taken through the line 2—2 in FIG. 1 with the timing belt removed.

FIG. 1 is a front plan view of a belt tensioner, generally indicated at 10, manufactured in accordance with the principles of the present invention. The tensioner 10 is shown in tensioning engagement with a timing belt 11. FIG. 2 is a cross sectional view of the tensioner 10 taken through the line 2—2 in FIG. 1. As shown, the tensioner 10 comprises a pivot 12 which is to be fixed relative to a motor vehicle engine, generally indicated at 13. Such mounting can be accomplished in any conventional fashion, e.g. by a conventional mounting bolt that would extend through the bore 14 in the pivot 12. When installed, the pivot 12 and base plate 36 are prevented from rotating on the engine as a result of the tightened bolt.

A tensioner arm, general indicated at 16, is mounted for pivotal movement on the pivot 12. This is preferably accomplished by use of a plastic sleeve bearing 18 between the arm 16 and pivot 12. The tensioner arm 16 has a radially inner friction surface 20, which is disposed in sliding friction relation with the adjacent surface of the sleeve bearing 18 during pivotal movement of the arm 16. In this construction, the sleeve bearing 18 remains generally fixed with respect to the pivot 12, and the arm 16 slides relative to the outer surface of the sleeve bearing 18. In an alternate contemplated arrangement, the sleeve bearing 18 may be considered as part of the tensioner arm and may rotate therewith. In this arrangement, the radially inner surface 22 of the sleeve bearing 18 constitutes a friction surface disposed in friction sliding relation with an adjacent surface, which is the radially outer surface 24 of the pivot 12. It should be noted that in the preferred embodiment, the sleeve bearing 18 is fixed to the arm 16 and slides on the pivot 12.

A belt engaging pulley 26 is mounted for rotation on the tensioner arm 16. Preferably, a convention ball bearing assembly 28 is used to mount the pulley 26 on the arm 16. The tensioner arm 16 is preferably of the eccentric type, which provides a more compact tensioner wherein the pulley 26 surrounds the bearing 18. However, the present invention applies to other types of tensioners, for example, wherein the pulley is rotatably mounted on an end of the arm remote from an opposite pivoted end of the arm, as disclosed in U.S. Pat. No. 4,824,421.

A spring 30 is coupled with the tensioner arm 16 and biases the arm 16 in a direction tending to force the pulley 26 into tensioning engagement with the belt when the belt tensioner is properly installed on the motor vehicle engine. During operation of the tensioner, the spring 30 biases the arm 16 into a working position in order to maintain a predetermined range of tension in the belt 12 during dynamic operating equilibrium of the belt and engine.

As shown, the spring 30 is preferably coupled to the arm by a radially outwardly extending tang 32 at one end of the spring. In addition, the opposite end of the spring comprises a radially outwardly extending tang 34, which is fixed to fixed base plate 36. When the tensioner is installed, the pivot 12 and base plate 36 are prevented from rotating or otherwise moving relative to the engine mounting surface due to the clamping action of the mounting bolt (not shown). The base plate 36 is preferably fixed to the pivot 12 so as to prevent relative rotation there between. Similarly, the end 34 of the spring 30 is fixed relative to the base plate 36, so that the end 34 of the spring is stationary relative to the engine 13, as is the case with the base plate 36 and pivot 12 when the tensioner is installed on the engine.

An anti-kickback mechanism 40 is coupled with the arm 16 and stops an instantaneous kickback movement of the arm 16. As used in the present application, the term "kickback" is intended to refer to instantaneous, relatively large, movement of the belt tensioner away from the belt tensioning direction. In FIG. 1, reference arrow indicates the direction in which the tensioner arm 16 is normally biased by spring 30 into tensioning engagement with the belt 11 by being biased for pivotal movement in a counter-clockwise direction about pivot axis P. The kickback direction is illustrated by reference arrow K, which is the direction that the arm will tend to move in response to tightening of the belt 12. In the preferred embodiment, the anti-kickback stop mechanism 40 includes a one-way wrap spring clutch 42 and a self-adjusting coupling, generally indicated at 44.

The anti-kickback mechanism will prevent instantaneous large movement of the arm 40 in the kickback direction (against the belt tensioning direction T) beyond a stop position when the arm 16 is instantaneously moved away from the dynamic working equilibrium working position of the tensioner in a kickback direction in response to instantaneous tightening of the belt. The stop position is not a fixed position, but is rather adjusted by the anti-kickback mechanism 40 according to the working position of the arm 16.

As used herein, the term "working position" is defined as the position at which the tensioner assumes during normal equilibrium running of the engine. Thus, it can be appreciated that "kickback" is instantaneous movement of the tensioner arm away from its normal working position in response to instantaneous tightening of the belt during rough engine operation.

The one-way wrapped spring clutch 42 is coupled with the self-adjusting coupling 44 when the arm 16 is moved in a kickback direction K against the belt-tensioning direction and it is decoupled from the self-adjusting coupling 44 when the arm 16 is moved in the belt tensioning direction T. Specifically, the wrap-spring clutch 42 is made from a coil spring material (preferably steel), has a tang 46 at one end thereof fixed to the arm 16 for movement therewith, and has at least one coil 48 at the opposite end of the tang 46, which coil 48 is constructed and arranged to selectively engage the elf-adjusting coupling 44 by being wrapped around the exterior surface 50 of portion of the self-adjusting coupling 44. When the arm 16 is suddenly pivoted about the pivot 12 in the kickback direction K, the wrap-spring clutch 42 contracts about the outer surface portion 50 of the self-adjusting coupling 44 until the wrap-spring clutch 42 can contract no further, at which point the wrap-spring clutch 42 stops further movement of arm 16 in the kickback direction. Thus, it can be appreciated that the wrap-spring clutch 42 limits an amount of instantaneous large kickback movement of the arm 16 from its dynamic working position. On the other hand, when the belt 12 goes slack, and there is a need for the tensioner to immediately move in the tensioning direction to maintain the tension of the belt 12 within a predetermined operating range, the arm 16 pivots accordingly in the belt tensioning direction T and moves tang 46 of the wrap-spring clutch therewith. When the arm 16 is moved in this direction, the tang 46 pushes on the coils in a direction which simply causes the engaged coils 48 to slip relative to the surface portion 50 so that the wrap-spring clutch 42 has no effect on the arm movement in the belt tensioning direction.

The self-adjusting coupling 44 preferably comprises a moveable member 60 and a fixed member 62. The fixed member 62 is an annular member fixed to the outer surface of the pivot 12, and the moveable member 60 is rotatably disposed with the respect to the fixed member 62. In the most preferred embodiment, a highly viscous material, such as a silicon based putty-like coupling material 64 is disposed between the fixed member 62 and the moveable member 60 so as to severely dampen movement of the moveable member 60 relative to the fixed member 62. A pair of annular seals 66 and 68 are disposed between the moveable member 60 and fixed member 62 and are constructed and arranged to seal or contain the viscous coupling material 64 in a space between the moveable member 60 and fixed member 62. The seals 66 and 68 permit sliding movement of the moveable member 60 relative thereto.

In an alternate embodiment, it is contemplated that rather than employing a viscous coupling material, a friction coupling material or lubricated friction coupling material may be used to couple the movable member 60 with the fixed member 62.

The self-adjusting coupling 44 is constructed and arranged such that the outer moveable member 60 operates as an essentially fixed member when the arm 16 is instantaneously moved in the kickback direction in response to instantaneous tensioning of the belt 12. This is a result of a highly damped movement of the self-adjusting coupling 44 under the influence of coupling material 64. Thus, when the wrap-spring clutch contracts about the movable member 60 in the kickback direction, the wrap spring clutch in conjunction with the self-adjusting coupling 44 serves to essentially stop movement of the arm beyond the threshold amount permitted by resilient contracting of the wrap-spring clutch, which threshold amount is measured as an amount of kickback movement away from the normal position assumed by the tensioner (e.g., the working position).

In instances in which the tension in the belt slowly increases (e.g. during hot running conditions in which the engine expands), the belt pushes against the tensioner and causes the arm to slowly creep in the kickback direction. In other words, the working position of the tensioner or of the arm slowly shifts with increasing tension in the belt, so that the working position creeps in the kickback direction. While this movement of the working position of the tensioner may initially be resisted by the operation of the one-way wrap spring clutch 42, the belt-adjusting coupling 44 will movement of the moveable member 60 under the torque of the wrap-spring clutch 42 to alleviate stress in the one-way wrapped spring clutch 42. Thus, the self-adjusting coupling 44, in essence operates to release tension from the wrap-spring clutch 42 over time to enable the tensioner to adapt to a new working position.

It should be appreciated that the spring 30 applies a first amount of force to the belt through the arm 16 and the pulley 26 during operation of the tensioner 10. The belt 12 applies an equal and opposite force to the pulley 26, which equal and opposite force forces the friction surface and the adjacent surface provided by any operable combination of the adjacent surfaces amongst the arm inner surface 20, sleeve bearing 18, and pivot outer surface 24 into forced engagement with one another. This forced engagement causes surface sliding friction between the friction surface and adjacent surface during movement of arm 16 about pivot 12 so as to dampen such movement. When the arm is initially moved slowly in the direction against the belt tightening direction under the influence of an incrementally tightening belt, the wrap-spring clutch 42 applies a second amount of spring force to the belt 12 and the pulley 26 in addition to the first amount applied by spring 30. Thus, during this initial creeping action of the tensioner and arm, the wrap-spring clutch 42 increases the amount of force of the forced engagement between the friction surface and the adjacent surface so as to increase the damping of pivotal movement of the arm 16 when the arm is moved in the direction against the belt tensioning direction. The wrap-spring clutch 42 also serves to dampen oscillatory movement of the tensioner by adding damping force between the sliding friction surfaces during such movement (e.g., during rough engine operation), when damping of movement is needed most to reduce tensioner wear.

Figure 3:
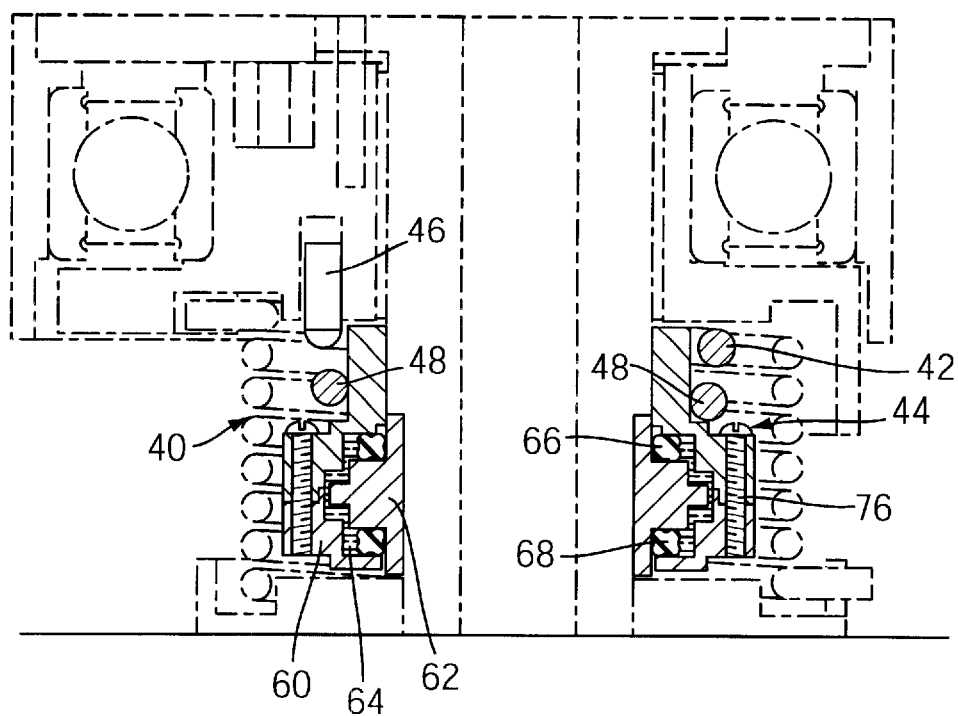
FIG. 3 is the cross-sectional view of FIG. 2 emphasizing an anti-kickback stop mechanism employed in the present invention.
Figure 4:
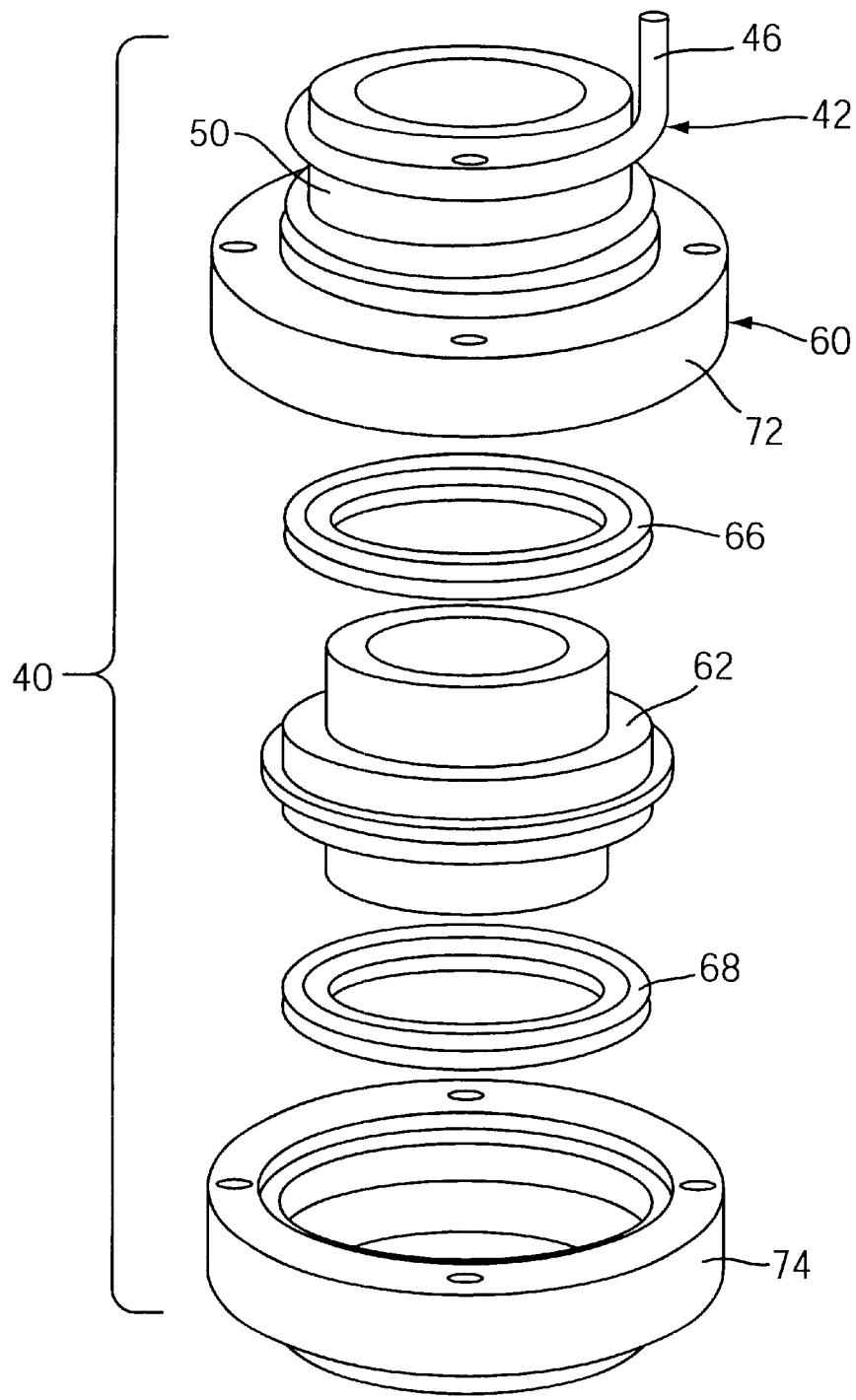
FIG. 4 is an exploded view of an anti-kickback stop mechanism employed in the present invention.

FIG. 4 is an exploded view of the anti-kickback mechanism 40. As can be appreciated, the outer moveable member 60 is formed from two parts, including a first part 72 and a second part 74, which parts are fastened together by a threaded fastener 76 (see FIGS. 2 and 3).

Figure 5:
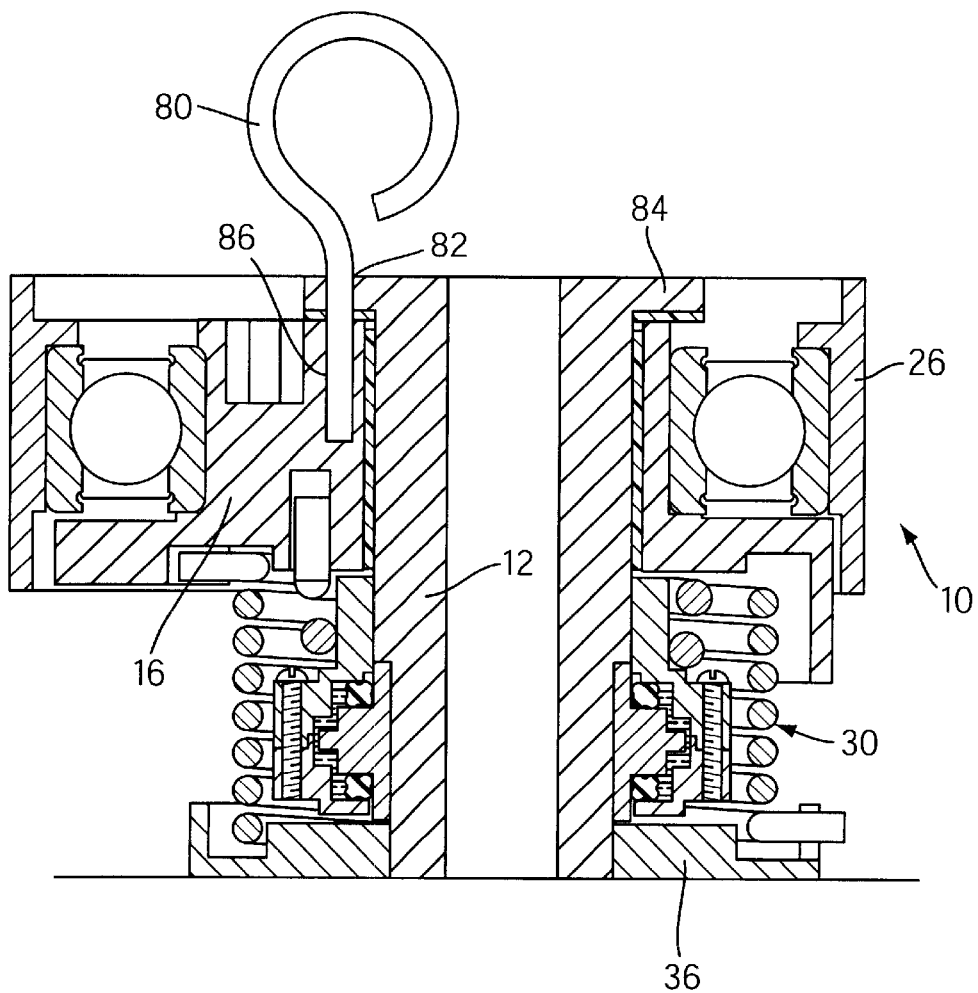
FIG. 5 is a sectional view taken through the line 5—5 in FIG. 6, and illustrates the tensioner prior to installation, with a removable pin in place.
Figure 6:
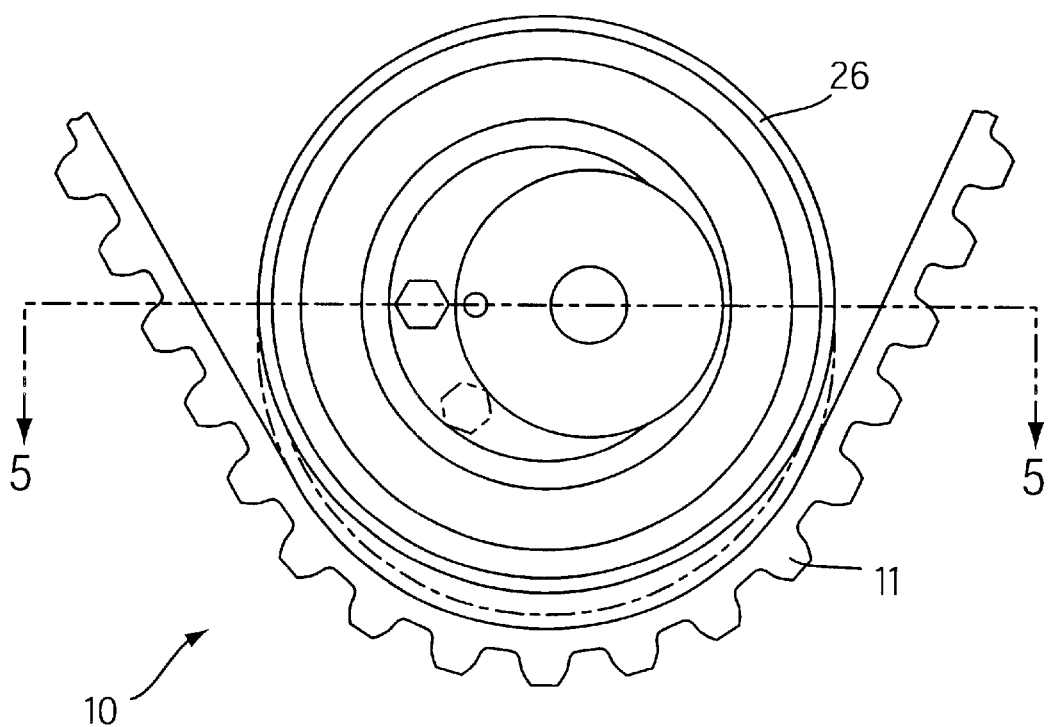
FIG. 6 is a front plan view of the tensioner of the present invention prior to installation by removal of the pin.

FIGS. 5 and 6 illustrate a preferred structure which can be used to install the tensioner 10. As shown, a removable pin 80 is inserted through an opening 82 in an outer flange 84 of the pivot 12. The pin also extends through an opening 86 in the tensioner arm 16. In production of the tensioner 10, the arm 16 is wound up against the bias of spring 30 and is disposed relative to the base plate 36 so that the tensioner arm 16 is held away from the position at which it will engage the belt upon installation. After the tensioner is mounted on the engine in its proper location, determined by the cooperation of base plate 36 with the engine mounting surface, the timing belt 12 is looped or trained around the outer surface of the pulley 26. At this time, the pin 80 can be removed, and the arm 16 will then be biased by the spring 30 so as to move the pulley 26 into tensioning engagement with the belt 12. Note that this simple installation methodology does not require any adjustment of the relative position of the tensioner arm for the purpose of obtaining a desired position relative to any stop member.

FIG. 6 illustrates the relative position of the tensioner when it is first mounted on the engine 14, and shows its position in phantom lines after the pin 80 has been removed and the tensioner snaps into tensioning relation with the belt 12.

Figure 7:
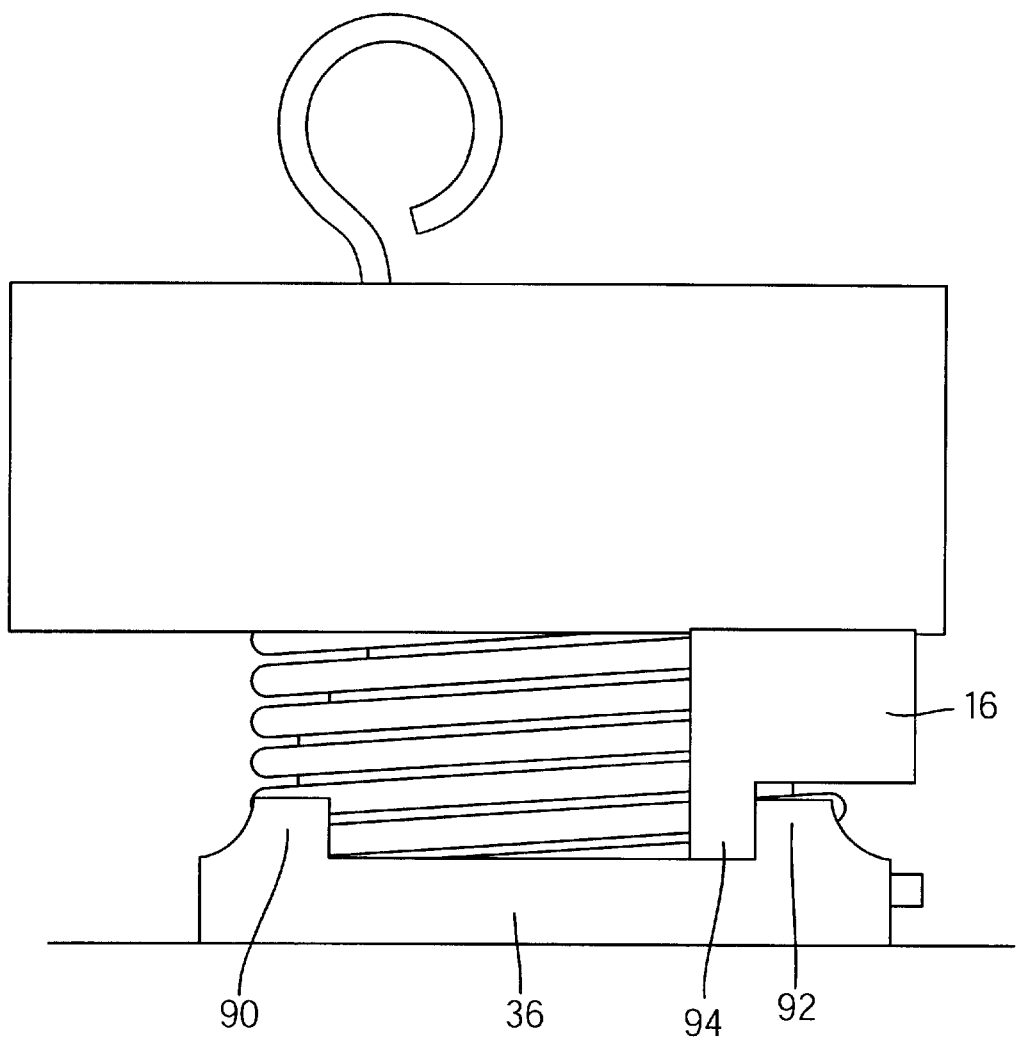
FIG. 7 is a side plan view of the tensioner of the present invention.

It is important to note that in accordance with the present invention, the adjustment required to position the arm relative to a fixed anti-kickback stop is eliminated. However, this does not mean that the tensioner should not operate in conjunction with a free arm stop and/or a belt load position stop to limit the range of movement of the arm 16. More specifically, as illustrated in FIG. 7, it is preferred that the base plate 36 be provided with a free arm stop 90 and a belt load positioning stop 92. The arm 16 is also preferably provided with a stop lug 94, which is simply an extension from the arm 16 that extends between the free arm stop 90 and the belt load position stop 92. Thus, the free arm stop 90 and the belt load position stop 92 effectively define the range of movement of the arm 16. The belt load position stop 92 is a fixed stop that is used to set the position of the tensioner arm 16 when inserting the pin 80 and also serves as the working position limit of the arm in the kickback direction (i.e. away from the belt tensioning arm direction). The free arm stop 90 serves to limit the movement of the arm in the belt-tensioning direction. The free arm stop 90 and belt load position stop 92 are stops which are used in conventional tensioners, and are known in the art.

In an alternate embodiment to that shown and described above, it is contemplated that the connection between the tang 46 of the one-way wrap-spring clutch 42 and the arm 16 be a lost motion connection. More specifically, in the first embodiment described above, the opening 47 in the arm 16 which received the tang 46 is simply a round hole which receives the tang 46 and does not permit any torsional or rotational relative movement between the tang 46 and arm 16. In the alternate embodiment, it is contemplated that the opening 47 for receiving the tang 46 comprise a generally arcuate slot, which is arcuate and in generally parallel relation about the outer surface 24 of the pivot 12. Such an arcuate slot would have an angular length or extent which is greater than that of the arc described by arm movement during continuous normal operating dynamic movement of the arm in its working position. It is preferred that this arcuate slot have a circumferential extent of about 20 to 80 degrees. In this embodiment, the tang 46 of the wrap-spring clutch 42 will generally center itself within the arcuate slot and cease to move during normal continuous operation. In this embodiment, the wrap-spring clutch 42 will not provide additional damping in addition to the damping provided by the coil spring 30 when the tensioner oscillates or creeps in the kickback direction, as was the case in the first embodiment. In this embodiment, the wrap-spring clutch will serve only in the anti-kickback function, and will not enhance the damping characteristics of the tensioner when the tensioner is moved in normal operation or in oscillation in a kickback direction.

It can thus be appreciated that the objects of the present invention have been fully and effectively accomplished. It is to be understood that the foregoing specific embodiment has been provided to illustrate the structural and functional principles of the present invention and is not intended to be limiting. To the contrary, the present invention is intended to encompass all modifications, substitutions and alterations within the spirit and scope of the appended claims.

It should be noted that limitations of the appended claims have not been phrased in the "means or step for performing a specified function" permitted by 35 U.S.C. §112, ¶6. This is clearly to point out the intent that the claims are not to be interpreted under §112, ¶6, as being limited solely to the structures, acts and materials disclosed in the present application or the equivalents thereof.

What is claimed is:

1. A timing belt tensioner for tensioning a belt on a motor vehicle engine, said tensioner comprising:
    a pivot constructed and arranged to be fixed relative to said motor vehicle engine;
    a tensioner arm mounted for pivotal movement on said pivot, said tensioner arm having a friction surface disposed in friction sliding relation with an adjacent surface during said pivotal movement;
    a belt-engaging pulley mounted for rotation on said tensioner arm;
    a spring coupled with said tensioner arm and constructed and arranged to bias said tensioner arm in a belt-tensioning direction tending to force the pulley into tensioning engagement with the belt when said tensioner is installed on the motor vehicle engine, said spring biasing said tensioner arm into a working position that maintains a predetermined range of tension in the belt during dynamic operating equilibrium of the belt; and
    an anti-kickback stop mechanism coupled with said tensioner arm and constructed and arranged 1) to stop instantaneous kickback movement of said tensioner arm away from said working position, in a kickback direction opposite to said belt-tensioning direction, beyond a limited initial amount; and 2) to permit the working position of the tensioner arm to adjust automatically under the influence of gradually and/or continuously applied belt tension loads.

2. A timing belt tensioner for tensioning a belt on a motor vehicle engine, said tensioner comprising:
    a pivot constructed and arranged to be fixed relative to said motor vehicle engine;
    a tensioner arm mounted for pivotal movement on said pivot, said tensioner arm having a friction surface disposed in friction sliding relation with an adjacent surface during said pivotal movement;
    a belt-engaging pulley mounted for rotation on said tensioner arm;
    a spring coupled with said tensioner arm and constructed and arranged to bias said tensioner arm in a belt-tensioning direction tending to force the pulley into tensioning engagement with the belt when said tensioner is installed on the motor vehicle engine, said spring biasing said tensioner arm into a working position that maintains a predetermined range of tension in the belt during dynamic operating equilibrium of the belt; and
    an anti-kickback stop mechanism coupled with said tensioner arm and constructed and arranged 1) to stop instantaneous kickback movement of said tensioner arm away from said working position, in a kickback direction opposite to said belt-tensioning direction, beyond a limited initial amount; and 2) to permit the working position of the tensioner arm to adjust automatically under the influence of gradually and/or continuously applied belt tension loads;
    wherein said anti-kickback stop mechanism comprises a one-way wrap-spring clutch and a self-adjusting coupling, said one-way wrap-spring clutch being coupled with said self-adjusting coupling when said tensioner arm is moved in said kickback direction and de-coupled from said self-adjusting coupling when said tensioner arm is moved in said belt-tensioning tensioning direction, said wrap-spring clutch being configured to permit said limited, pre-defined initial amount of kickback movement of said tensioner arm from said working position; and
    wherein said self-adjusting coupling is configured automatically to relieve tension on said wrap-spring clutch when said tensioner arm shifts to a new working position.

3. A timing belt tensioner according to claim 2, wherein said self-adjusting coupling comprises a fixed member, a moveable member, and a viscous material disposed between said fixed and moveable members, said vicious material damping movement of said movable member relative to said fixed member, said one-way wrap-spring clutch being coupled with said movable member when said tensioner arm is moved in said kickback direction.

4. A timing belt tensioner according to claim 2,
    wherein said spring applies a first amount of force to the belt through said tensioner arm and said pulley during operation of said tensioner with the belt applying an equal and opposite force to said pulley, said equal and opposite force forcing said friction surface and said adjacent surface into forced engagement with one another and said forced engagement causing surface sliding friction between said friction surface and said adjacent surface so as to dampen pivoting movement of said tensioner arm about said pivot; and
    wherein said wrap spring clutch applies a second amount of force to the belt through said tensioner arm and said pulley, in addition to said first amount of force, when said tensioner arm is moved in said kickback direction, said wrap spring clutch thereby increasing the total level of force of forced engagement between said friction surface and said adjacent surface so as to increase dampening of pivoting arm movement when said tensioner arm is moved in said kickback direction.

5. A timing belt tensioner according to claim 1, further comprising a mounting bolt used to mount the tensioner on the motor vehicle engine, wherein said pivot is concentric with said mounting bolt when the tensioner is mounted on the motor vehicle engine.

6. A timing belt tensioner according to claim 5, further comprising a removable member that retains said tensioner arm at a pre-installation position in which the tensioner arm is disposed away from a static tensioning position that the tensioner arm assumes when the belt is static and the tensioner arm is tensioning the belt, the removable member enabling an installer to train the belt about the pulley when installing the tensioner, whereafter the removable member can be removed from the tensioner so that the tensioner arm moves the pulley into tensioning engagement with the static belt.

7. A timing belt tensioner according to claim 2, wherein said anti-kickback stop mechanism is coupled with said tensioner arm in a manner which permits relative lost motion movement between said anti-kickback stop mechanism and said tensioner arm so that initial movement of said tensioner arm in said kickback direction is permitted without biasing said one-way wrap spring clutch.

8. A timing belt tensioner for a motor vehicle engine, comprising:

a pivot constructed and arranged to be fixed relative to said motor vehicle engine;

a tensioner arm mounted for pivotal movement on said pivot, said tensioner arm having a friction surface disposed in friction sliding relation with respect to an adjacent surface during said pivotal movement;

a belt-engaging pulley mounted for rotation on said tensioner arm;

a spring coupled with said tensioner arm and constructed and arranged to bias said tensioner arm in a direction tending to force the pulley into tensioning engagement with a belt when said tensioner is installed on the motor vehicle engine, said spring biasing said arm into a working position that maintains a predetermined range of tension in the belt during dynamic operating equilibrium of the belt; and an anti-kickback stop mechanism comprising a one-way clutch mechanism and a self-adjusting coupling;

said one-way clutch mechanism being coupled with said arm and constructed and arranged to stop instantaneous kickback movement of said tensioner arm away from said working position beyond an initial, threshold amount of kickback movement; and wherein said self-adjusting coupling cooperates with said one-way clutch mechanism so that the initial, threshold amount of kickback movement that is permitted before said one-way clutch mechanism stops said instantaneous kickback movement is the same regardless of the location of said working position.

9. A timming belt tensioner according to claim 8, wherein force applied by the belt to said tensioner causes force of engagement between said friction surface of said tensioner arm and said adjacent surface so as to create sliding surface friction damping of pivotal movement of said tensioner arm, wherein said sliding surface friction damping is the predominant mechanism that dampens pivotal movement of said tensioner arm.

* * * * *